United States Patent Office 3,226,640
Patented Dec. 28, 1965

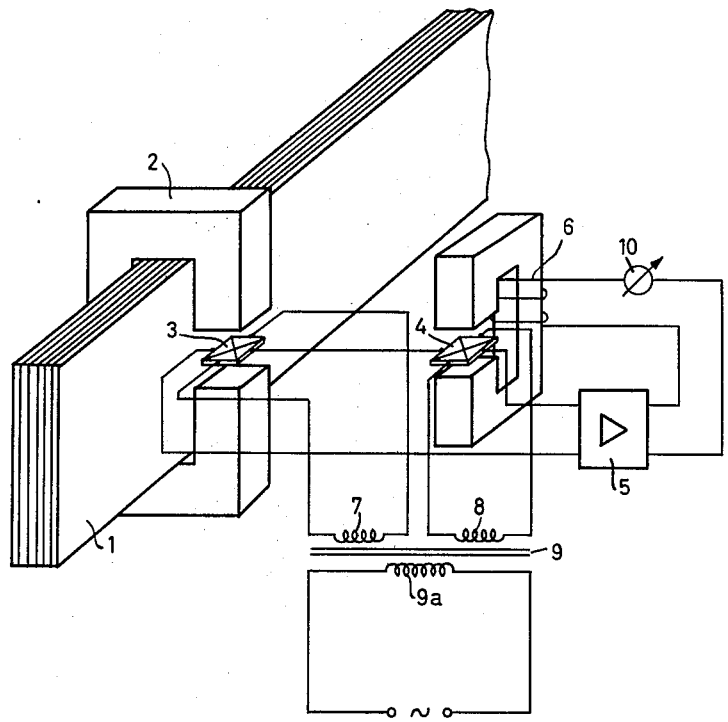

3,226,640
D.C. MEASURING DEVICE USING HALL PLATES CONNECTED IN FEEDBACK RELATIONSHIP AND HAVING A COMMON CONTROL SOURCE
Friedrich Kuhrt and Karl Maaz, Nurnberg, Erich Rainer, Erlangen, and Julius Brunner, Nurnberg, Germany, assignors to Siemens-Schuckertwerke Aktiengesellschaft, Berlin-Siemensstadt, Germany, a corporation of Germany
Filed Jan. 31, 1962, Ser. No. 170,181
Claims priority, application Germany, Feb. 2, 1961,
S 72,331
4 Claims. (Cl. 324—117)

Our invention relates to direct-current measuring devices of the Hall-voltage generating type. Such devices are known, for example, from U.S. Patents 2,946,155 of F. Kuhrt and 2,886,779 of F. Kuhrt et al., both assigned to the assignee of the present invention.

Devices of this type may comprise a yoke or core structure of soft-magnetic (high-permeability) material which can be placed about the conductor, such as a bus bar, carrying the current to be measured. The magnetizable structure may be provided with one or more field gaps, each containing a Hall plate in form of a thin wafer of semiconducting material, preferably indium antimonide or indium arsenide. The Hall plates are magnetically excited by the field of the direct current and are simultaneously traversed by a control current, with the result that the generated Hall voltage, appearing across two Hall or probe electrodes on opposite sides of the plate, or the sum of several such generated voltages if a plurality of field gaps with a corresponding plurality of Hall plates are used, is indicative of the amount of current flowing in the conductor.

In the known devices of this type, the measuring accuracy depends upon the accuracy with which the controlling current through the Hall plate or plates is kept constant. For high-precision measurements, a very high degree of constancy is required for the control current that is being passed through the Hall plate or plates while the measuring operation is being performed. This requires a great amount of equipment and space for the regulated current supply unit, which, as a rule, is employed for deriving the control current from an available utility line.

It is an object of our invention to provide a direct-current measuring device on the Hall-voltage generating principle that is capable of securing a high precision measurement without the requirement for maintaining a constant control current.

To this end, and in accordance with a feature of our invention, we provide a direct-current measuring device equipped with at least one Hall plate with an additional Hall modulator and with an amplifier having a direct-current output. We then control the amplifier by the difference between the measuring Hall-voltage and the modulator Hall-voltage and employ the amplified output current (unidirectional) for exciting the magnetic field winding of the Hall modulator, all Hall generators or Hall plates of the device having a single source of alternating current in common for supplying the Hall plates with control current.

In such a device, the direct current flowing in the excitation winding of the Hall modulator is proportional to the conductor current to be measured because the amplifier tends to reduce the difference between measuring Hall voltage and modulator Hall voltage down to the zero value. Consequently, the conductor current to be ascertained can be measured by measuring the direct current flowing in the output circuit of the amplifier, which can simply be done by connecting a direct-current measuring instrument of the indicating or recording type in this output circuit. The direct-current measuring instrument may also consist of the sensor or pilot member of the regulating circuit in which case the output current of the amplifier can selectively or additionally be employed as a measuring signal for initiating a control or regulating operation for example upon the conductor current being measured or responded to.

The alternating current source common to all Hall plates of the device consists preferably and in the simplest manner of a transformer equipped with mutually isolated secondary windings which supply respective control currents for the Hall plates of the Hall generator and the Hall modulator.

The invention may be further described with reference to the embodiment of a measuring device according to the invention illustrated by way of example on the accompanying drawing which shows in schematic perspective a bus bar inductively linked with the Hall generator, and also the electric circuit diagram of the other components of the complete measuring equipment.

For ssmplicity the illustrated Hall generator, is provided with only one Hall plate although it will be understood that the invention is analogously applicable for Hall generators having two or more Hall plates such as known from the above-mentioned Patent 2,886,779. According to the patent, opposite legs of a yoke or core structure surrounding a direct-current bus bar may each be provided with a field gap, and each gap may contain a Hall plate, the Hall voltages of the two plates being connected in series. In this manner any measuring errors due to extraneous or spurious fields and iron masses can be avoided.

The illustrated device is shown used in conjunction with a multi-part bus bar 1 about which a soft-magnetic yoke structure 2 is placed. The yoke structure has a field gap whose width is shown exaggerated to facilitate illustration. Disposed in the gap is a Hall plate 3 of rectangular shape consisting of indium arsenide or indium antimonide (InAs, InSb). The Hall plate is provided with two metallic electrodes or terminals that extend along the narrow side of the rectangular shape for the purpose of passing through the plate an electric control current in the longitudinal direction. The plate is further provided with two probe or Hall electrodes located on the respective long edges midway between the current supply terminals. According to the invention the device comprises an additional Hall modulator composed of a second Hall plate 4 and a magnetic field excitation coil 6. The coil is mounted in conventional manner on a core structure of magnetizable material having a field gap in which the Hall plate 4 is located substantially in the same manner as shown for the Hall generator described above. The Hall plate 4 may consist of the same material as the Hall plate 3 and may have the same size and the same design, although the details are not essential to the invention. The Hall electrodes of plates 3 and 4 are all connected in series so that the respective Hall voltages of the two plates are impressed upon the input circuit of an amplifier 5 in series-opposed relation. The amplifier 5 has a direct-current output circuit connected to the excitation winding 6 of the Hall modulator.

The control currents for the two Hall plates 3 and 4 are furnished from respective secondary windings 7 and 8 of a transformer 9 whose primary winding 9a has terminals for connection to a current supply line, for example a utility line of 110 or 220 v. and 50 or 60 c.p.s. Connected in the output circuit of the amplifier 5 is a direct-current measuring instrument 10 which is preferably calibrated in units or tens of the bus-bar current to effect a direct indication or recording of the current magnitude to be measured.

The current in the excitation winding 6 of the Hall modulator is so adjusted by the amplifier 5 that the Hall voltages of the generator plate 3 and the modulator plate 4 are of equal magnitudes. Then the excitation current is proportional to the current flowing in the conductor 1. The controlling alternating current flowing through the Hall plate need not be kept constant because voltage fluctuations in the alternating-current line energizing the transformer 9 effect only the regulating steepness or characteristic of the overall measuring device. However, this is irrelevant when a sufficiently large gain or amplification factor is provided for. Also in contrast to the above-mentioned known direct-current measuring devices with Hall generators, it is no longer necessary to provide for linearization compensation in dependence upon the measuring load. As a result a measuring device is obtained which, by virtue of the relatively small addition of material and space satisfies particularly exacting accuracy requirements over prolonged periods of operation.

While a specific embodiment of the invention has been described in detail it will be obvious to those skilled in the art that the invention may be otherwise embodied.

We claim:

1. A direct-current measuring device for use with a conductor traversed by the direct current to be measured, comprising Hall voltage generator means having magnetizable core structure to be inductively linked with the conductor and having first Hall plate means traversed by magnetic flux of said core structure due to current flowing in the conductor, said Hall plate means having control-current supply terminals and Hall electrodes; a Hall-voltage modulator, having magnet winding means and second Hall plate means traversed by magnetic flux excited by said winding means, said second Hall plate means having current-supply terminals and Hall electrodes; alternating-current supply means common to said two Hall plate means and connected to said terminals of said respective Hall plate means, circuit means connecting the Hall electrodes of said first and second Hall plates in differential relation and having output leads, amplifier means having an input connected to said output leads and an output circuit connected to said winding means for constraining the Hall voltage of the second Hall plate toward the Hall voltage of the first plate, and meter means for measuring the output of said amplifier means.

2. A direct-current measuring devce for use with a conductor traversed by the direct current to be measured, comprising a Hall voltage generator having a magnetizable core structure of generally annular shape for surrounding said conductor, said core having a field gap, and said generator having a first Hall plate disposed in said gap and provided with control-current supply terminals and Hall electrodes; a Hall-voltage modulator, having a magnet-field excitation winding and a second Hall plate in the field of said winding, said second Hall plate having current-supply terminals and Hall electrodes; alternating-current supply means common to said two Hall plates and connected to said terminals of both said plates, circuit means connecting the Hall electrodes of said first and second Hall plates in differential relation and having output leads, amplifier means having an input connected to said output leads and an output circuit connected to said winding means for constraining the Hall voltage of the second Hall plate toward the Hall voltage of the first plate, and meter means for measuring the output of said amplifier means.

3. A direct-current measuring device according to claim 1, said meter means comprising a direct-current measuring instrument connected in said output circuit in addition to said winding and calibrated in terms of the conductor current being measured.

4. In a direct-current measuring device according to claim 1, said alternating-current supply means comprising a transformer having two mutually isolated secondary windings of which each is connected to said terminals of one of said two respective Hall plates.

References Cited by the Examiner

UNITED STATES PATENTS 2,885,629   5/1959   Tschermak _____ 324—45
2,928,048   3/1960   Postal _____ 324—117

WALTER L. CARLSON, *Primary Examiner.*